(12) United States Patent
Knoedler

(10) Patent No.: US 11,498,434 B2
(45) Date of Patent: Nov. 15, 2022

(54) VEHICLE DEVICE AND METHOD FOR OPERATING A VEHICLE DEVICE

(71) Applicant: Robert Bosch GmbH, Stuttgart (DE)

(72) Inventor: Andreas Knoedler, Iggingen (DE)

(73) Assignee: Robert Bosch GmbH, Stuttgart (DE)

( * ) Notice: Subject to any disclaimer, the term of this patent is extended or adjusted under 35 U.S.C. 154(b) by 291 days.

(21) Appl. No.: 16/761,773

(22) PCT Filed: Nov. 14, 2018

(86) PCT No.: PCT/EP2018/081134
§ 371 (c)(1),
(2) Date: May 5, 2020

(87) PCT Pub. No.: WO2019/101585
PCT Pub. Date: May 31, 2019

(65) Prior Publication Data
US 2021/0178910 A1 Jun. 17, 2021

(30) Foreign Application Priority Data
Nov. 22, 2017 (DE) .................. 10 2017 220 805.8

(51) Int. Cl.
*B60L 50/40* (2019.01)
*B60L 58/13* (2019.01)
(Continued)

(52) U.S. Cl.
CPC .............. *B60L 50/40* (2019.02); *B60L 1/003* (2013.01); *B60L 3/04* (2013.01); *B60L 58/13* (2019.02); *H02J 7/345* (2013.01); *H02J 2310/40* (2020.01)

(58) Field of Classification Search
CPC .......... H02J 1/06; H02J 7/345; H02J 2310/40; B60L 58/13; B60L 1/003; B60L 3/04; B60L 50/40; Y02T 10/70
See application file for complete search history.

(56) References Cited

U.S. PATENT DOCUMENTS

2014/0346864 A1\* 11/2014 Chemin .................. H02J 7/345
307/10.6
2016/0347197 A1\* 12/2016 Fink ........................ B60L 58/21

FOREIGN PATENT DOCUMENTS

DE 197 34 598 C1 2/1999
DE 100 33 317 A1 1/2002
(Continued)

OTHER PUBLICATIONS

International Search Report corresponding to PCT Application No. PCT/EP2018/081134, dated Feb. 13, 2019 (German and English language document) (7 pages).

(Continued)

*Primary Examiner* — Jared Fureman
*Assistant Examiner* — Duc M Pham
(74) *Attorney, Agent, or Firm* — Maginot, Moore & Beck LLP

(57) ABSTRACT

A vehicle device includes at least one calculating logic, at least one electric and/or electronic functional unit, and at least one stored buffer energy source, which is operatively connected to the calculating logic and the functional unit and which is configured to at least partially buffer and/or stabilize a vehicle electrical system voltage of a vehicle electrical system in a normal operating state for supplying power to the functional unit. The vehicle device further includes at least one monitoring unit which is configured, in at least one malfunctioning state, in which the vehicle electrical system voltage drops below a voltage limit value and/or a gradient of the vehicle electrical system voltage exceeds a gradient limit value, to at least partially limit the energy intake of the functional unit and to enable an at least temporary power supply of the calculating logic by the stored buffer energy source.

13 Claims, 1 Drawing Sheet

(51) Int. Cl.
*B60L 1/00* (2006.01)
*B60L 3/04* (2006.01)
*H02J 7/34* (2006.01)

(56) References Cited

FOREIGN PATENT DOCUMENTS

| DE | 10 2004 025 649 A1 | 12/2005 | | |
|---|---|---|---|---|
| DE | 10 2008 005 307 A1 | 7/2009 | | |
| DE | 10 2015 115 755 A1 | 3/2017 | | |
| JP | 2004-37310 A | 2/2004 | | |
| JP | 2004037310 A | * 2/2004 | ............... | G01P 1/06 |
| JP | 2009-247153 A | 10/2009 | | |
| JP | 2010-23821 A | 2/2010 | | |
| JP | 2016-103935 A | 6/2016 | | |
| JP | 2017-140888 A | 8/2017 | | |
| WO | 2017/144871 A1 | 8/2017 | | |

OTHER PUBLICATIONS

Bahr, A., "Low Battery Cranking Pulse in Automotive Applications," Application Note AN2201/D, Rev. 0, Freescale Semiconductor, Inc., 2001 (8 pages).
Singh, A., "Load Dump and Cranking Protection for Automotive Backlight LED Power Supply," Application Report SNVA681A, Texas Instruments, 2015 (8 pages).
"What the Designer Should Know: Introduction to Automotive Linear Voltage Regulators," Infineon, Issue 2014 (32 pages).
"AN2689 Application Note", STMicroelectronics, 2012 (42 pages).

* cited by examiner

VEHICLE DEVICE AND METHOD FOR OPERATING A VEHICLE DEVICE

This application is a 35 U.S.C. § 371 National Stage Application of PCT/EP2018/081134, filed on Nov. 14, 2018, which claims the benefit of priority to Serial No. DE 10 2017 220 805.8, filed on Nov. 22, 2017 in Germany, the disclosures of which are incorporated herein by reference in their entirety.

Background

The disclosure is directed to a vehicle device, and a method for operating a vehicle device. In addition, the disclosure relates to a vehicle.

The prior art discloses vehicle devices comprising an actuator configured, for example, as an electric motor, comprising computation logic, and comprising a buffer capacitor which is provided to buffer and/or to stabilize an on-board electrical system voltage of a vehicle on-board electrical system, for supplying energy to the actuator. The computation logic is used, for example, for bus communication and/or for writing to fault memories. Furthermore, compared to the buffer capacitor, the vehicle device may comprise smaller-sized additional buffer capacitors which are associated with the computation logic and which are provided to keep the computation logic active as long as possible in the case of brief voltage dips of the vehicle electrical system, for example, by means of a starter pulse and/or a short circuit. However, in particular severe and/or longer-lasting voltage dips of the vehicle electrical may result in a voltage of the additional buffer capacitors no longer being sufficient to completely bridge the voltage dip, whereby an undesired and/or undesirable reset or restart of the computation logic is generally triggered.

The object of the disclosure is in particular to provide a vehicle device having improved characteristics with respect to supplying energy.

SUMMARY

The disclosure is directed to a vehicle device comprising at least one computation logic unit, comprising at least one function unit, and comprising at least one buffer energy store which is functionally connected to the computation logic and the function unit, and which is provided to at least partially buffer and/or stabilize an on-board electrical system voltage of a vehicle electrical system in a normal operating state for supplying energy to the function unit.

It is proposed that the vehicle device comprises at least one monitoring unit which is provided to at least partially limit the energy consumption of the function unit and to enable an at least temporary power supply to the computation logic via the buffer energy store, in particular in addition to the vehicle electrical system and/or alternatively to the vehicle electrical system, in at least one faulty operational state, for example, caused by a starter pulse and/or a short circuit in the vehicle electrical system, in which the on-board electrical system voltage falls below a voltage limit value and/or a gradient of the on-board electrical system voltage exceeds a gradient limit value. Preferably, in this case, the faulty operational state is different from a pure on-board electrical system voltage ripple of the on-board electrical system voltage. By means of this design, in particular an energy supply to the computation logic can be improved, wherein it can be advantageously be ensured that an energy supply to the computation logic is sufficient even in the case of severe voltage dips of the vehicle electrical system, in order to completely bridge the voltage dip, whereby an undesired and/or undesirable reset or restart of the computation logic can be advantageously prevented. In addition, advantageously, flexibility of the vehicle device may be increased, and/or efficiency, in particular power efficiency, installation space efficiency, component efficiency, and/or cost efficiency, may be improved.

In this context, "vehicle device" is to be understood to mean in particular at least a portion, in particular a subassembly, of a vehicle and advantageously of a motor vehicle. In particular, in this case, the vehicle may also comprise the vehicle electrical system. Furthermore, the vehicle may advantageously comprise a steering system which is provided in particular for influencing a travel direction of the vehicle. In addition, the vehicle device may comprise additional components and/or assemblies, for example, at least one switching unit which may be arranged, using switching technology, between a vehicle electrical system terminal of the vehicle device, in particular for connecting the vehicle electrical system, and the buffer energy store; at least one coupling switching which may be arranged, using switching technology, between the buffer energy store and the function unit and/or the computation logic; and/or at least one control electronic circuit for controlling operation of the function unit, the computation logic, and/or the monitoring unit. "Provided" is to be understood to mean in particular specifically programmed, designed, and/or equipped. "An object is provided for a specific function" is to be understood to mean in particular that the object fulfills and/or carries out this specific function in at least one application state and/or operating state.

In this context, "computation logic" is to be understood to mean to mean in particular an electrical and/or electronic unit which has an information input, information processing, and an information output. Advantageously, the computation logic furthermore comprises at least one processor, at least one memory, at least one input and/or output means, at least one operating program, at least one control routine, at least one regulation routine, and/or at least one computation routine. Advantageously, in the normal operating state, the computation logic is supplied with electrical energy by the vehicle electrical system. In this case, the computation logic may, for example, be provided for bus communication, writing to fault memories, and/or at least for controlling operation of at least one advantageously safety-related vehicle component of the vehicle. Advantageously, in addition, the computation logic is integrated into a control unit of the vehicle and/or the steering system. Furthermore, the computation logic may also be advantageously integrated into the monitoring unit.

In addition, a "function unit" may be understood to mean in particular a unit which is provided to perform at least one function which is associated in particular with the vehicle and advantageously with the steering system, in at least one operating state. In this case, the function can be any arbitrary function, for example, an illumination function, a ventilation function, a climate control function, a detection function, a control and/or regulation function, a steering torque function, and/or a steering function, in particular a steering angle superposition function and/or a steering assistance function. Preferably, the function unit is configured as an actuator unit, in particular as an electric machine, and advantageously as an electric motor. Particularly advantageously, the function unit is further configured as part of the steering system. Furthermore, a "buffer energy store" is to be understood to mean in particular an energy store which is in particular electrically functionally connected to the vehicle electrical system, and which is provided to at least temporarily store and/or buffer electrical energy provided by the vehicle electrical system. In this case, in particular, the buffer energy store is associated with the function unit at least in the normal operating state. In particular, the vehicle device may also comprise several, for example, two, at least three, and/or at least four, buffer energy stores, which are advantageously connected in parallel with one another and are in particular provided for interacting for supplying energy to the function unit in the normal operating state, and/or for at least temporarily supplying energy to the computation logic in the faulty operational state.

Furthermore, a "monitoring unit" is to be understood in particular to mean a unit which is designed at least partially electrically and/or electronically and which is in particular provided for ascertaining the faulty operational state, to monitor the on-board electrical system voltage of the vehicle electrical system, energy consumption of the function unit, an energy supply to the computation logic, and/or a fault signal correlated with the faulty operational state, and in particular in the faulty operational state, to activate the function unit, the buffer energy store, the switching unit, the control electronic circuit, and/or the coupling circuit, in such a way that in the faulty operational state, at least a portion, and advantageously at least a majority, of energy stored in the buffer energy store is transmitted to the computation logic for at least temporarily supplying energy to the computation logic. In this case, the expression "at least a majority" is to be understood to mean in particular at least 55%, advantageously at least 65%, preferably at least 75%, particularly preferably at least 85%, and particularly advantageously at least 95%.

According to an advantageous embodiment of the disclosure, the function unit and the computation logic are connected to one another in parallel, whereby in particular an advantageously simple control algorithm can be provided.

The function unit and/or the computation logic could, for example, be connected to the buffer energy store by means of the in particular optional coupling circuit. However, it is advantageously proposed that the function unit and/or the computation logic has/have a direct electrical connection to the buffer energy store, in particular without an intermediate switching element, whereby in particular costs may be reduced and/or activation may be simplified. Particularly advantageously, the function unit and the computation logic have a direct electrical connection to the buffer energy store.

In addition, it is proposed that, in the faulty operational state, the buffer energy store is provided to maintain an energy supply to the computation logic for at least 15 ms, advantageously for at least 20 ms, preferably for at least 25 ms, and particularly preferably for at least 50 ms. In particular, in this case, the buffer energy store is sized in such a way that, in the faulty operational state, an energy supply can be maintained to the computation logic for at least 15 ms, advantageously for at least 20 ms, preferably for at least 25 ms, and particularly preferably for at least 50 ms. As a result, at least a majority of all voltage dips occurring the vehicle electrical system can advantageously be bridged.

A particularly simple and/or economical variant can in particular be provided if the buffer energy store is configured as a capacitor and has a capacitance of at least 750 μF and advantageously at least 1000 μF.

Preferably, the faulty operational state corresponds to a brief voltage dip of the on-board electrical system voltage, wherein the voltage limit value is at most 9 V, advantageously at most 6 V, and particularly preferably at most 3 V, and/or the gradient limit value has a magnitude of at least 1 V/ms, advantageously at least 2 V/ms, preferably at least 3 V/ms, and particularly advantageously at least 4 V/ms. In this context, the expression "brief" is to be understood to mean a duration of at least 1 ms, preferably at least 5 ms, and particularly preferably at least 10 ms, and/or at most 50 ms, preferably at most 25 ms, and particularly preferably at most 15 ms. As a result, advantageously, an energy supply to the computation logic may be ensured even during a brief voltage dip.

Furthermore, the monitoring unit may be provided to decouple and/or bridge the function unit in the faulty operational state, for example, by activating the in particular optional coupling circuit. However, particularly preferably, it is proposed that the monitoring unit is provided, in the faulty operational state, to at least partially switching off the function unit, and/or to put it into an in particular energy-saving quiescent state, in particular in such a way that energy consumption of the function unit is reduced by at least 35%, advantageously by at least 55%, preferably by at least 75%, and particularly preferably by at least 95%. As a result, it is possible to further improve efficiency, in particular power efficiency, component efficiency, and/or installation space efficiency.

According to a particularly preferable embodiment of the disclosure, for ascertaining the faulty operational state, it is proposed that the monitoring unit is provided to monitor the on-board electrical system voltage of the vehicle electrical system, in particular a voltage profile and/or an instantaneous voltage value of the on-board electrical system voltage, in particular directly. Advantageously, in this case, the monitoring unit is configured as a voltage detection unit. As a result, it is possible to achieve in particular advantageously direct monitoring of the on-board electrical system voltage.

Alternatively or in addition, it is proposed that, for ascertaining the faulty operational state, the monitoring unit is connected to a vehicle control, for example, an engine control, and is provided to ascertain the faulty operational state based on a fault signal of the vehicle control, in particular the aforementioned fault signal. In this case, in particular, the vehicle and/or the vehicle device may also comprise the vehicle control. In particular, in the faulty operational state, the vehicle device is provided to supply the control signal and to transmit it to the monitoring unit. As a result, it is possible to achieve in particular especially simple and/or economical monitoring of the on-board electrical system voltage, using control technology.

Furthermore, it is proposed that the vehicle device comprises at least one switching unit, in particular the aforementioned switching unit, which is provided to disconnect the vehicle electrical system at least from the buffer energy store and advantageously from the function unit and/or the computation logic, in the faulty operational state, as a function of an activation signal of the monitoring unit. As a result, in particular an advantageous energy supply to the computation logic may be ensured, wherein it can in particular be prevented that energy stored in the buffer energy store flows back into the vehicle electrical system.

Preferably, it is furthermore proposed that the switching unit is configured as a reverse polarity protection circuit, and in particular comprises at least one switching element which is advantageously configured as a semiconductor switching element, and at least one diode which is connected in parallel with the switching element. As a result, in particular cost-efficiency may be improved, since advantageously already-existing assemblies can be used for disconnecting the vehicle electrical system.

In a particularly preferable embodiment of the disclosure, it is furthermore proposed that the function unit is configured as an electric motor and is provided for generating and/or providing electrical steering assistance. As a result, in particular components and/or assemblies of the steering system may be advantageously used for and/or limited to supplying energy to the computation logic.

In addition, the disclosure relates to a method for operating a vehicle device which comprises at least one computation logic unit, at least one electrical and/or electronic function unit, and at least one buffer energy store which is functionally connected to the computation logic and the function unit and which is provided to at least partially buffer and/or stabilize an on-board electrical system voltage of a vehicle electrical system in a normal operating state for supplying energy to the function unit.

It is proposed that, in at least one faulty operational state, for example, caused by a starter pulse and/or a short circuit in the vehicle electrical system, in which the on-board electrical system voltage falls below a voltage limit value and/or a gradient of the on-board electrical system voltage exceeds a gradient limit value, energy consumption of the function unit is at least partially limited, in particular by means of a monitoring unit, and the computation logic is at least temporarily supplied with electrical energy by the buffer energy store. In this case, in particular, in the faulty operational state, at least a portion, and advantageously at least a majority, of energy stored in the buffer energy store is transmitted to the computation logic for at least temporarily supplying energy to the computation logic. As a result, in particular an energy supply to the computation logic may be improved, wherein it may advantageously be ensured that an energy supply to the computation logic is sufficient to completely bridge the voltage dip even in the case of severe voltage dips of the vehicle electrical system, whereby an undesired and/or undesirable reset or restart of the computation logic may be advantageously prevented. In addition, advantageously, flexibility of the vehicle device may be increased, and/or efficiency, in particular power efficiency, installation space efficiency, component efficiency, and/or cost efficiency, may be improved.

However, the vehicle device and the method for operating the vehicle device are not to be limited to the aforementioned application and embodiment. In particular, the vehicle device and the method for operating the vehicle device may have a number of individual elements, components, and units deviating from a number mentioned herein, for fulfilling a functionality described herein.

BRIEF DESCRIPTION OF THE DRAWINGS

Additional advantages result from the following description of the drawings. The drawings depict an exemplary embodiment of the disclosure. The drawings, the description, and the claims contain numerous features in combination. Those skilled in the art will also advantageously consider the features individually and combine them into reasonable additional combinations.

The following are depicted.

DETAILED DESCRIPTION

Figure 1:
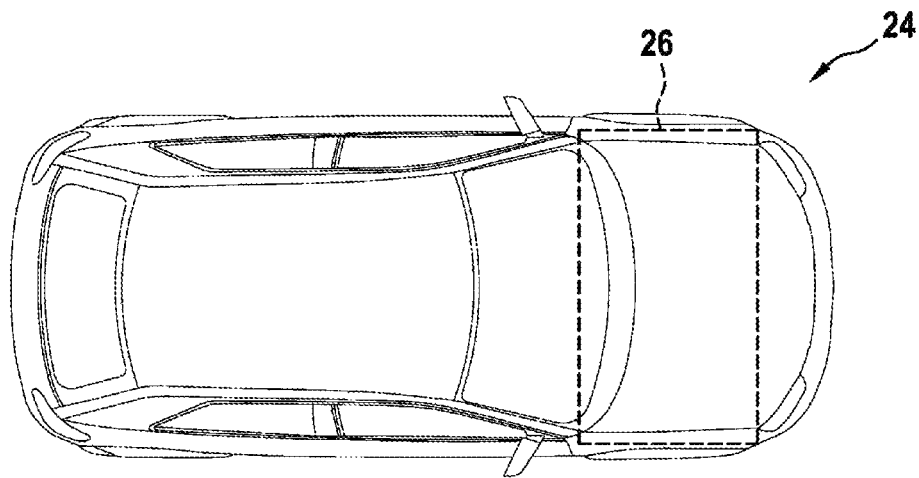
FIG. 1 depicts, by way of example, a top view of a vehicle which is configured as a motor vehicle and which comprises a vehicle device.

FIG. 1 depicts a simplified view of a vehicle 24 which is configured as a motor vehicle by way of example, comprising several vehicle wheels and comprising a steering system 26. The steering system 26 has a functional connection to the vehicle wheels and is provided for influencing a travel direction of the vehicle 24. Furthermore, the steering system 26 is configured as an electrically assisted steering system and accordingly has electric power assistance. However, in principle, it is also conceivable to configure a steering system as a hydraulically assisted steering system, in particular having hydraulic power assistance. In addition, it is conceivable to configure a steering system having electric superposition steering and/or power steering. Furthermore, in principle, a steering system could also be configured as a steer-by-wire steering system.

Figure 2:
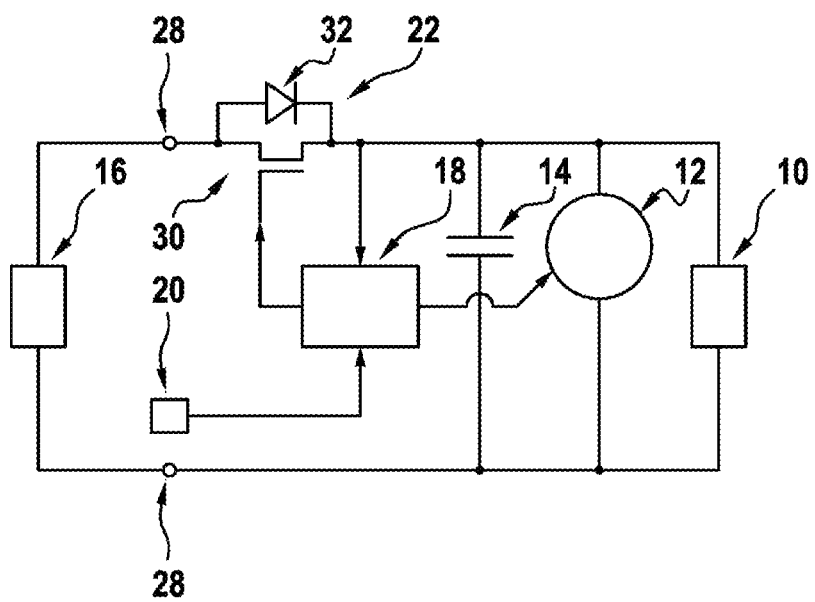
FIG. 2 depicts a schematic representation of a circuit arrangement of the vehicle device.

The vehicle 24 comprises an energy source in the form of a vehicle electrical system 16 (see FIG. 2). The vehicle electrical system 16 is provided to supply an on-board electrical system voltage. In this case, the vehicle electrical system 16 has, by way of example, an on-board electrical system voltage of 12 V. In principle, however, a vehicle electrical system could also supply an on-board electrical system voltage which deviates from 12 V. In addition, it is conceivable to provide several vehicle electrical systems having different on-board electrical system voltages.

The vehicle 24 furthermore comprises a vehicle device. The vehicle device comprises computation logic 10. The computation logic 10 comprises at least one processor (not depicted), for example, in the form of a microprocessor, and at least one memory (not depicted). In addition, the computation logic 10 comprises at least one operating program which is stored in the memory and which includes at least one computing routine, at least one control routine, and/or at least one regulating routine.

The computation logic 10 furthermore has an electrical functional connection to the vehicle electrical system 16. In this case, the computation logic 10 is connected to the vehicle electrical system 16 in such a way that, in a normal operating state, the computation logic 10 is supplied with electrical energy by the vehicle electrical system 16. In the present case, the computation logic 10 is, by way of example, provided for writing to fault memories. However, alternatively or in addition, computation logic may also be provided for bus communication and/or at least for controlling operation of at least one advantageously safety-related vehicle component.

Furthermore, the vehicle device comprises a function unit 12. The function unit 12 is configured electrically and/or electronically. The function unit 12 is configured as an actuator unit. In the present case, the function unit 12 is, by way of example, configured as an electric motor, in particular as a permanently excited synchronous motor.

The function unit 12 has an electrical functional connection to the vehicle electrical system 16. In this case, the function unit 12 is connected to the vehicle electrical system 16 in such a way that, in a normal operating state, the function unit 12 is at least partially supplied with electrical energy by the vehicle electrical system 16. In addition, the function unit 12 is connected in parallel with the computation logic 10. In the present case, the function unit 12 has a direct electrical connection to the computation logic 10, in particular without an intermediate switching element or the like.

In addition, the function unit 12 is part of the steering system 26. In the present case, the function unit 12 is part of the electrical power steering and in particular is provided for generating and/or providing electrical steering assistance. Alternatively, however, a function unit could also be configured as any other function unit and/or could perform a function deviating from a steering assistance function. In this connection, it is purely conceivable, by way of example, that a function unit is provided for displacing a steering control element and/or a rack-and-pinion position control, for example, in the case of a vehicle having an autonomous driving mode and/or a steer-by-wire steering system. In addition, a function unit could be configured as a steering torque unit and provided for generating a steering resistance and/or a restoring torque to a steering wheel. In addition, it is generally also conceivable to configure a function unit independently of a steering system. In addition, it is conceivable to arrange a function unit in series with computation logic. In addition, a function unit could also be connected to computation logic via at least one switching element.

Furthermore, the vehicle device comprises at least one buffer energy store 14. In the present case, the vehicle device comprises, by way of example, exactly one buffer energy store 14. The buffer energy store 14 is configured as a capacitor. The buffer energy store 14 has a capacitance of approximately 1000 μF.

The buffer energy store 14 has an electrical functional connection to the vehicle electrical system 16. In addition, the buffer energy store 14 has an electrical functional connection to the computation logic 10 and the function unit 12. In the present case, the buffer energy store 14 is connected in parallel with the computation logic 10 and the function unit 12. In this case, the buffer energy store 14 has a respective direct electrical connection to the computation logic 10 and the function unit 12, in particular without an intermediate switching element or the like.

The buffer energy store 14 is provided to at least temporarily store and/or buffer electrical energy provided by the vehicle electrical system 16. In the present case, the buffer energy store 14 is at least provided for least partially buffering and/or stabilizing the on-board electrical system voltage of the vehicle electrical system 16, in the normal operating state, for supplying energy to the function unit 12. In principle, however, a vehicle device could also comprise several buffer energy stores. In addition, a buffer energy store could also be configured as a battery or the like. Furthermore, it is conceivable to arrange a buffer energy store in series with computation logic and/or a function unit. In addition, computation logic and/or a function unit could also be connected to a buffer energy store via at least one switching element.

In addition, the vehicle device comprises a switching unit 22. In the present case, the switching unit 22 is configured as a reverse polarity protection circuit. The switching unit 22 is arranged, using switching technology, between a vehicle electrical system terminal 28 of the vehicle device, which is provided in particular for connecting the vehicle electrical system 16, and the buffer energy store 14. In the present case, the switching unit 22 is provided to connect the vehicle electrical system 16 to the buffer energy store 14, the function unit 12, and the computation logic 10, and/or to disconnect the vehicle electrical system 16 from the buffer energy store 14, the function unit 12, and the computation logic 10.

For this purpose, the switching unit 22 comprises at least one semiconductor switching element 30, for example, in the form of a MOSFET, and a diode 32 which is connected in parallel with the semiconductor switching element 30. In principle, however, it is also conceivable to omit a diode. In addition, a switching unit could comprise several switching elements and/or semiconductor switching elements. In addition, it is also conceivable to configure at least one switching element of the switching unit as a relay. Furthermore, in principle, a switching unit could also be completely omitted. In this case, it is conceivable to implement a reverse polarity protection circuit, for example, exclusively by means of a diode and/or multiple diodes.

During the operation of the vehicle 24, various malfunction states may occur, for example, a brief voltage dip of the on-board electrical system voltage, in which the on-board electrical system voltage falls below a voltage limit value and/or a gradient of the on-board electrical system voltage exceeds a gradient limit value, and which, for example, may be caused by a starter pulse and/or a short circuit in the vehicle electrical system 16. Such malfunction states may, for example, result in undesired and/or undesirable restarts of the computation logic 10 due to an insufficient energy supply.

In order to ensure a sufficient energy supply to the computation logic 10 even in such a faulty operational state, the vehicle device furthermore comprises a monitoring unit 18. The monitoring unit 18 is at least partially configured electrically and/or electronically. In the present case, the monitoring unit 18 is configured as a voltage detection unit.

The monitoring unit 18 has an electrical functional connection to the vehicle electrical system 16. The monitoring unit 18 furthermore has an electrical functional connection to the function unit 12. In addition, the monitoring unit 18 is functionally connected to the switching unit 22. In the present case, the monitoring unit 18 has a direct electrical connection to the switching unit 22, in particular a control terminal of the switching unit 22.

The monitoring unit 18 is provided to ascertain a faulty operational state in which the on-board electrical system voltage falls below a voltage limit value and/or a gradient of the on-board electrical system voltage exceeds a gradient limit value. In this case, the monitoring unit 18 is provided to actively monitor the on-board electrical system voltage of the vehicle electrical system 16, and based on a voltage profile and/or an instantaneous voltage value of the on-board electrical system voltage, to ascertain the faulty operational state. In this case, the faulty operational state corresponds to a brief voltage dip of the on-board electrical system voltage of at least 25 ms. The voltage limit value is furthermore between 3 V and 9 V. In addition, in the present case, for ascertaining the faulty operational state, the monitoring unit 18 is connected to a vehicle control 20, for example, an engine control, of the vehicle device, and is provided to ascertain the faulty operational state in addition based on a fault signal of the vehicle control 20. In principle, however, it is also conceivable to ascertain a faulty operational state exclusively based on a voltage profile and/or an instantaneous voltage value of the on-board electrical system voltage, or based on a fault signal of a vehicle control.

In addition, in a faulty operational state in which the on-board electrical system voltage falls below the voltage limit value and/or the gradient of the on-board electrical system voltage exceeds the gradient limit value, the monitoring unit 18 is provided to at least partially limit energy consumption of the function unit 12 and to enable an at least temporary energy supply to the computation logic 10 via the buffer energy store 14.

In this case, the buffer energy store 14 sized in such a way that in the faulty operational state, an energy supply to the computation logic 10 can be maintained for at least 25 ms, whereby in particular at least a majority of all voltage dips occurring in the vehicle electrical system 16 can be bridged.

In the current case, in the faulty operational state, the monitoring unit 18 is provided to activate the switching unit 22 in such a way that the vehicle electrical system 16 is disconnected from the buffer energy store 14, the function unit 12, and the computation logic 10, whereby it may in particular be prevented that energy stored in the buffer energy store 14 flows back into the vehicle electrical system 16. In addition, in the faulty operational state, the monitoring unit 18 is provided to at least partially switch off the function unit 12 and/or to put it into an in particular energy-saving quiescent state, such that energy consumption of the function unit 12 is reduced and at least a majority of energy stored in the buffer energy store 14 is transmitted to the computation logic 10 for at least temporarily supplying energy to the computation logic 10. By means of these measures, an advantageous energy supply to the computation logic 10 may be achieved, and it may be ensured that an energy supply to the computation logic 10 is sufficient even in the case of severe voltage dips of the vehicle electrical system 16, in order to completely bridge the voltage dip and to prevent an undesired and/or undesirable restart of the computation logic 10.

The invention claimed is:

1. A vehicle device for a vehicle, the vehicle device comprising:
   at least one computation logic unit;
   at least one function unit having an actuator configured to perform a function of the vehicle;
   at least one buffer energy store connected to the at least one computation logic unit and the at least one function unit, the buffer energy store being configured to, in a normal operating state, at least partially buffer and/or stabilize an on-board electrical system voltage of a vehicle electrical system that supplies energy to the at least one function unit; and
   at least one monitoring unit configured to (i) monitor the on-board electrical system voltage to detect at least one faulty operational state in which the on-board electrical system voltage falls below a voltage limit value and/or a gradient of the on-board electrical system voltage exceeds a gradient limit value and (ii), in response to detecting at least one faulty operational state, at least partially limit an energy consumption of the at least one function unit and enable an at least temporary energy supply to the at least one computation logic unit via the buffer energy store.

2. The vehicle device as claimed in claim 1, wherein at least one of the at least one function unit and the at least one computation logic unit is electrically connected directly to the buffer energy store.

3. The vehicle device as claimed in claim 1, wherein in the faulty operational state, the buffer energy store is configured to maintain the temporary energy supply to the at least one computation logic unit for at least 15 ms.

4. The vehicle device as claimed in claim 1, wherein the buffer energy store is configured as a capacitor and has a capacitance of at least 750 µF.

5. The vehicle device as claimed in claim 1, wherein:
   the faulty operational state corresponds to a brief voltage dip of the on-board electrical system voltage, and
   the voltage limit value is at most 9 V.

6. The vehicle device as claimed in claim 1, wherein the monitoring unit is configured, in the faulty operational state, to at least partially switch off the at least one function unit and/or to put the at least one function unit into an energy-saving quiescent state.

7. The vehicle device as claimed in claim 1, wherein, for ascertaining the faulty operational state, the monitoring unit is configured to monitor the on-board electrical system voltage of the vehicle electrical system.

8. The vehicle device as claimed in claim 1, wherein, for ascertaining the faulty operational state, the monitoring unit is connected to a vehicle control and is configured to ascertain the faulty operational state based on a fault signal of the vehicle control.

9. The vehicle device as claimed in claim 1, further comprising:
   at least one switching unit configured to disconnect the vehicle electrical system at least from the buffer energy store, in the faulty operational state, as a function of an activation signal of the monitoring unit.

10. The vehicle device as claimed in claim 9, wherein the switching unit is configured as a reverse polarity protection circuit.

11. The vehicle device as claimed in claim 1, wherein the at least one function unit is configured as an electric motor and is configured to generate and/or to provide electrical steering assistance.

12. A vehicle comprising:
   at least one vehicle electrical system; and
   at least one vehicle device including at least one computation logic unit, at least one function unit having an actuator configured to perform a function of the vehicle, at least one buffer energy store, and at least one monitoring unit,
   wherein the buffer energy store is functionally connected to the at least one computation logic unit and the at least one function unit,
   wherein the buffer energy store is configured to, in a normal operating state, at least partially buffer and/or stabilize an on-board electrical system voltage of a vehicle electrical system that supplies energy to the at least one function unit, and
   wherein the at least one monitoring unit is configured to (i) monitor the on-board electrical system voltage to detect at least one faulty operational state in which the on-board electrical system voltage falls below a voltage limit value and/or a gradient of the on-board electrical system voltage exceeds a gradient limit value and (ii), in response to detecting at least one faulty operational state, at least partially limit an energy consumption of the at least one function unit and enable an at least temporary energy supply to the at least one computation logic unit via the buffer energy store.

13. A method for operating a vehicle device for a vehicle, the vehicle device including at least one computation logic unit, at least one function unit having an actuator configured to perform a function of the vehicle, and at least one buffer energy store connected to the at least one computation logic unit and the at least one function unit, the method comprising:
   in a normal operating state, using the buffer energy store, at least partially buffering and/or stabilizing an on-board electrical system voltage of a vehicle electrical system that supplies energy to the at least one function unit;
   monitoring, with the monitoring unit, the on-board electrical system voltage to detect at least one faulty operational state in which the on-board electrical system voltage falls below a voltage limit value and/or a gradient of the on-board electrical system voltage exceeds a gradient limit value; and
   in response to detecting at least one faulty operational state, at least partially limiting energy consumption of the at least one function unit and at least temporarily supplying the computation logic with electrical energy via the buffer energy store.

* * * * *

UNITED STATES PATENT AND TRADEMARK OFFICE
CERTIFICATE OF CORRECTION

| | |
|---|---|
| PATENT NO. | : 11,498,434 B2 |
| APPLICATION NO. | : 16/761773 |
| DATED | : November 15, 2022 |
| INVENTOR(S) | : Knoedler |

It is certified that error appears in the above-identified patent and that said Letters Patent is hereby corrected as shown below:

In the Claims

In Claim 12:
At Column 10, Line 28: "the buffer energy store is functionally connected" should read --the at least one buffer energy store is connected--.
At Column 10, Line 31: "the buffer energy store" should read --the at least one buffer energy store--.

In Claim 13:
At Column 10, Line 54: "the buffer energy store" should read --the at least one buffer energy store--.

Page 1 of 1

Signed and Sealed this
Twenty-third Day of May, 2023

Katherine Kelly Vidal
*Director of the United States Patent and Trademark Office*